Jan. 9. 1934.  J. R. HOWARD  1,942,756
MINNOW BUCKET
Filed June 3, 1932  2 Sheets-Sheet 1

J. R. Howard, Inventor

By C. A. Snow & Co.
Attorneys.

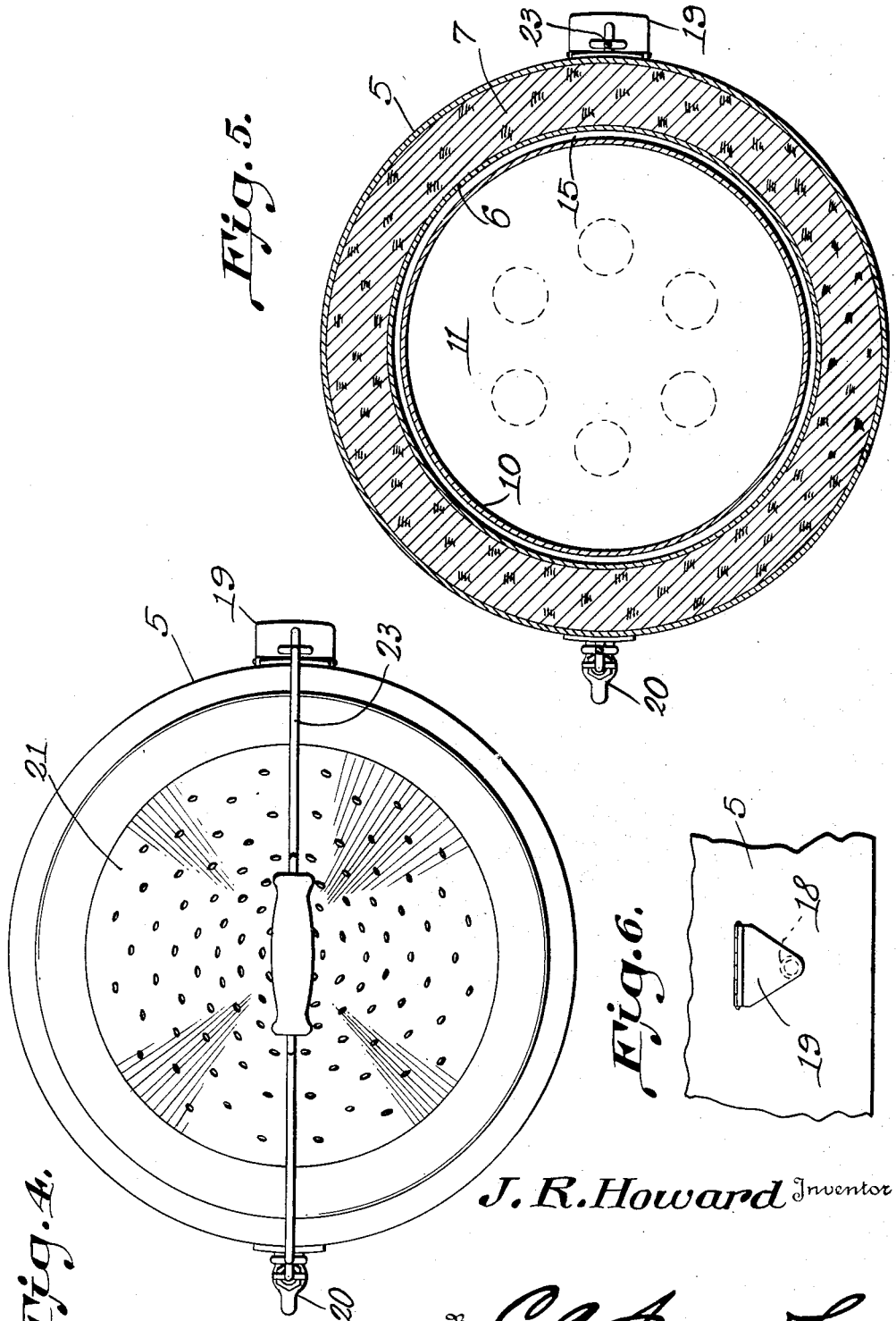

UNITED STATES PATENT OFFICE 1,942,756

MINNOW BUCKET

John R. Howard, Concord, N. C.

Application June 3, 1932. Serial No. 615,221

4 Claims. (Cl. 43—56)

This invention relates to minnow buckets, the primary object of the invention being to provide novel means whereby the water in the minnow compartment will be maintained at a cool temperature, thereby preserving the life of the minnows contained therein.

Another object of the invention is the provision of a minnow bucket of this character which is constructed in such a way that the water compartment and ice compartment are insulated to protect the water and ice against the heat of the atmosphere.

A still further object of the invention is to provide a drinking water compartment constructed so that the water contained therein will be cooled by the ice in the ice compartment, thereby providing a supply of cool drinking water, while the bucket is in use.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 4 is a plan view of the bucket.

Figure 5 is a sectional view taken on line 5—5 of Figure 1.

Figure 6 is a plan view illustrating the funnel which is arranged at one end of the pipe through which drinking water is poured into the drinking water compartment.

Figure 2:
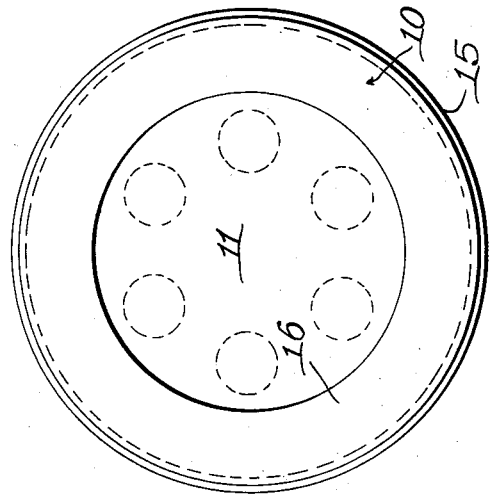
Figure 2 is a top plan view of the fish and water containers of the bucket.
Figure 3:
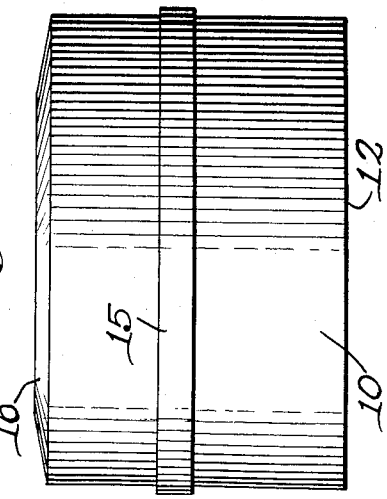
Figure 3 is an elevational view of the fish and water containers.
Figure 1:
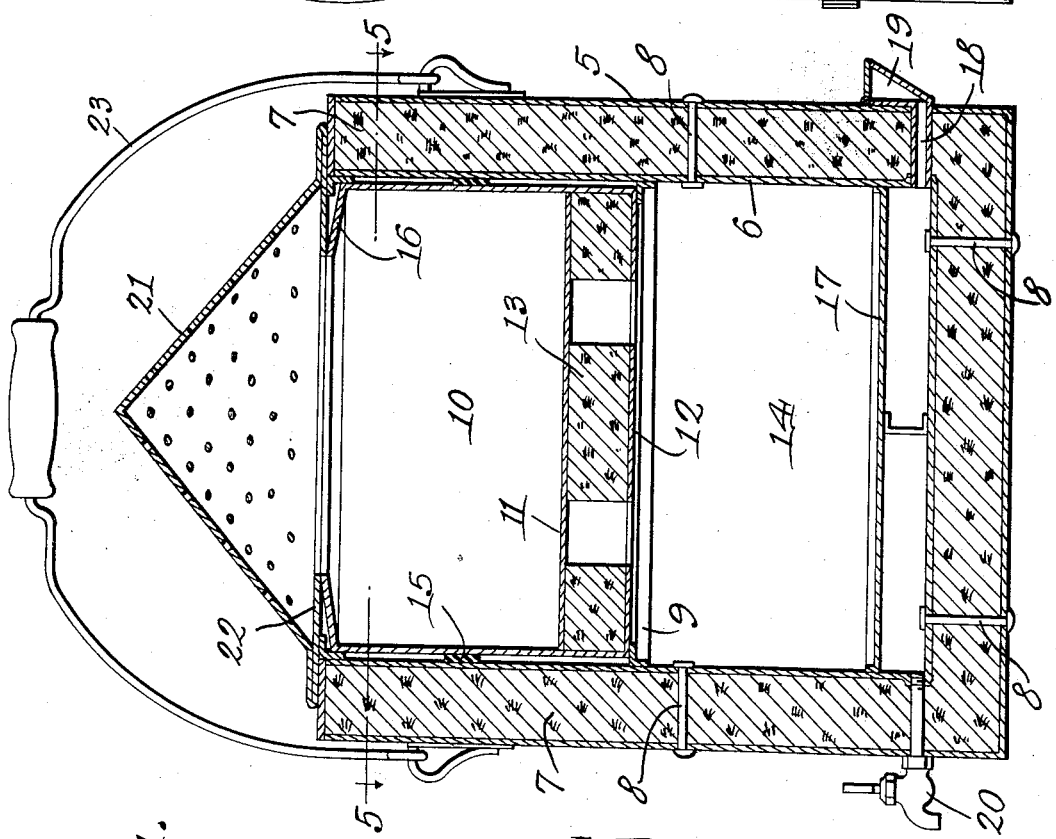
Figure 1 is a vertical sectional view through a minnow bucket constructed in accordance with the invention.

Referring to the drawings in detail, the device comprises a body portion including an outer casing 5 and an inner casing 6, the casings being spaced apart, as clearly shown by Figure 1 of the drawings.

The space between the outer casing and inner casing, is filled with cork indicated at 7, thereby thoroughly insulating the inner casing from the outer casing, to preserve the ice which is positioned within the ice compartment of the bucket.

The inner and outer casings are held together by means of the rivets 8, that pass through registering openings in the casings.

Supported within the inner casing, is a circular flange 9, that provides a support for the container 10 in which the water and minnows are placed, when the bucket is in use.

A bottom member 11 is arranged within the container 10 and spaced from the bottom 12 of the container, the space between the bottom member 11 and bottom 12 being filled with cork indicated at 13, insulating the bottom member from the bottom 12.

A plurality of openings are formed in the bottom 12, and the cork material is cut away at points adjacent to the openings, so that cold from the ice contained in the ice compartment 14, may pass to the bottom member 11, to cool the water held in the container 10.

The band indicated by the reference character 15, and which is constructed of rubber, cork or other suitable sealing means, is arranged on the container 10 and is so constructed that it will seal the space between the container 10 and inner casing 6, preventing cool air from passing from the ice compartment around the sides of the container 10.

An inwardly extended annular flange 16 is formed at the upper end of the container 10, and provides means to prevent the water and fish held in the container 10, from splashing or spilling, while the minnow bucket is being carried or transported.

Spaced from the bottom of the inner casing 6, is an auxiliary bottom 17, which provides the bottom for the ice compartment.

The space between the auxiliary bottom 17 and bottom of the inner container, provides a compartment for drinking water which is cooled by the ice contained in the ice compartment 14.

Extending through the side of the body portion, near the base thereof and communicating with the drinking water containing compartment, is a pipe 18 which is supplied with a funnel 19 at one end thereof, for feeding water to the drinking water containing compartment.

At the opposite side of the drinking water containing compartment, is a spigot 20, through which water may be withdrawn from the drinking water containing compartment.

The reference character 21 designates the cover for the bucket, which is substantially cone shaped and perforated, so that air may enter the fish and water compartment 10.

The cover includes an inwardly extended flange 22, that contacts with the inwardly extended flange 16, providing a close connection between the flanges, to prevent the water splashing from the container 10 and passing into the ice compartment therebelow.

In order that the bucket may be conveniently carried, the usual bail 23 is provided.

From the foregoing it will be seen that due to the construction shown and described, the water and fish within the water will be maintained cool during hot weather, thereby increasing the life of the minnows contained in the compartment 10.

While I have shown and described a minnow bucket which is circular in formation, it is to be understood that the bucket may be made oval, rectangular, or any other desired shape, without departing from the spirit of the invention.

Having thus described the invention what is claimed is:

1. A minnow bucket comprising a body portion including an outer casing and an inner casing, insulating material between the casings, a supporting flange within the inner casing, a fish container resting on the flange and providing an ice compartment between the container and bottom of the body portion, said fish container having an auxiliary bottom insulated from the bottom of the container, the main bottom of the container having openings to allow cold from the ice in the ice compartment to radiate to the fish container, and a cover for the bucket.

2. A minnow bucket comprising a body portion, a minnow container removably supported within the body portion, means for supporting the minnow container in spaced relation with the bottom of the body portion providing an ice compartment between the bottom of the body portion and container, an inwardly extended flange forming a part of the minnow container, a cover for the body portion, an inwardly extended flange on the cover and engaging the flange of the container, and said cover having openings to permit air to pass to the minnow container.

3. A minnow bucket comprising a body portion, an auxiliary bottom within the body portion and spaced from the bottom of the body portion providing a water compartment, a minnow container supported within the body portion and spaced from the auxiliary bottom providing a compartment, the bottom of the minnow container comprising spaced members, means between the spaced members for insulating the spaced members from each other, the bottom of the minnow container having openings extending to the innermost spaced member, to permit cold to radiate to the minnow container, means for providing a fluid-tight seal between the minnow container and body portion, and a cover for the bucket.

4. A minnow bucket comprising a body portion, a minnow container removably held within the body portion, means for supporting the minnow container in spaced relation with the bottom of the minnow bucket, providing an ice compartment, said minnow container including a bottom formed of spaced walls, insulating material between the spaced walls, one of said walls and the insulating material being formed with registering openings to allow cold from the ice container to pass to the minnow container, and a cover for the bucket.

JOHN R. HOWARD.